United States Patent
Yliaho

(10) Patent No.: US 10,817,059 B2
(45) Date of Patent: Oct. 27, 2020

(54) METHOD AND APPARATUS FOR ADAPTIVE FEEDBACK

(71) Applicant: Nokia Technologies Oy, Espoo (FI)

(72) Inventor: Marko Yliaho, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 626 days.

(21) Appl. No.: 14/568,054

(22) Filed: Dec. 11, 2014

(65) Prior Publication Data
US 2015/0177837 A1 Jun. 25, 2015

(30) Foreign Application Priority Data

Dec. 20, 2013 (GB) .................. 1322634.5

(51) Int. Cl.
G06F 3/16 (2006.01)
G06F 3/01 (2006.01)

(52) U.S. Cl.
CPC .............. G06F 3/016 (2013.01); G06F 3/167 (2013.01)

(58) Field of Classification Search
CPC ................. G06F 3/167; G06F 3/016
USPC .................. 715/727, 702
See application file for complete search history.

(56) References Cited

U.S. PATENT DOCUMENTS

| 7,064,655 | B2 | 6/2006 | Murray et al. | |
|---|---|---|---|---|
| 8,494,507 | B1* | 7/2013 | Tedesco | A61F 4/00 434/112 |
| 2004/0127198 | A1 | 7/2004 | Roskind et al. | |
| 2011/0077055 | A1 | 3/2011 | Pakula et al. | |
| 2011/0095875 | A1 | 4/2011 | Thyssen et al. | |
| 2011/0210926 | A1* | 9/2011 | Pasquero | G06F 3/016 345/173 |
| 2011/0264491 | A1* | 10/2011 | Birnbaum | G06F 3/016 705/14.4 |
| 2012/0001749 | A1 | 1/2012 | Cruz-Hernandez | |
| 2012/0028577 | A1 | 2/2012 | Rodriguez et al. | |
| 2012/0229400 | A1 | 9/2012 | Birnbaum et al. | |
| 2012/0229424 | A1 | 9/2012 | Behles et al. | |
| 2013/0250500 | A1 | 9/2013 | Tossavainen et al. | |
| 2013/0257817 | A1 | 10/2013 | Yliaho | |

FOREIGN PATENT DOCUMENTS

| EP | 2395414 A1 | 12/2011 |
|---|---|---|
| GB | 2445436 A | 7/2008 |
| WO | 2004/062300 A2 | 7/2004 |
| WO | 2008/147622 A2 | 12/2008 |

(Continued)

OTHER PUBLICATIONS

Hoggan et al., "Audio or Tactile Feedback: Which Modality When?", Proceedings of the SIGCHI Conference on Human Factors in Computing Systems, Apr. 9, 2009, pp. 2253-2256.

(Continued)

Primary Examiner — Andrea C Leggett
(74) Attorney, Agent, or Firm — Alston & Bird LLP

(57) ABSTRACT

A method, apparatus and computer program in which: an adaptive feedback profile is stored; user feedback signals are produced according to the adaptive feedback profile; contextual information is determined; context of the apparatus is detected based on the contextual information; and the adaptive feedback profile is adapted according to the detected context.

20 Claims, 2 Drawing Sheets

(56) References Cited

FOREIGN PATENT DOCUMENTS

| WO | 2009/150287 A1 | 12/2009 |
| WO | 2011/041535 A1 | 4/2011 |
| WO | 2013/049048 A2 | 4/2013 |
| WO | 2013/136133 A1 | 9/2013 |
| WO | 2013/156815 A1 | 10/2013 |
| WO | 2013/156819 A1 | 10/2013 |

OTHER PUBLICATIONS

"Haptics White Paper: Improving the Mobile User Experience Through Touch", Immersion Corporation, Retrieved on Jan. 28, 2015, Webpage available at : http://www.immersion.com/docs/Haptics_Improving-Mobile-UE_jun10v2.pdf.
"Koskinen, "Optimizing Tactile Feedback for Virtual Buttons in Mobile Devices", Master's Thesis, Jan. 28, 2008, 95 Pages."
Search Report received for corresponding United Kingdom Patent Application No. 1322634.5, dated May 20, 2014, 5 pages.

\* cited by examiner

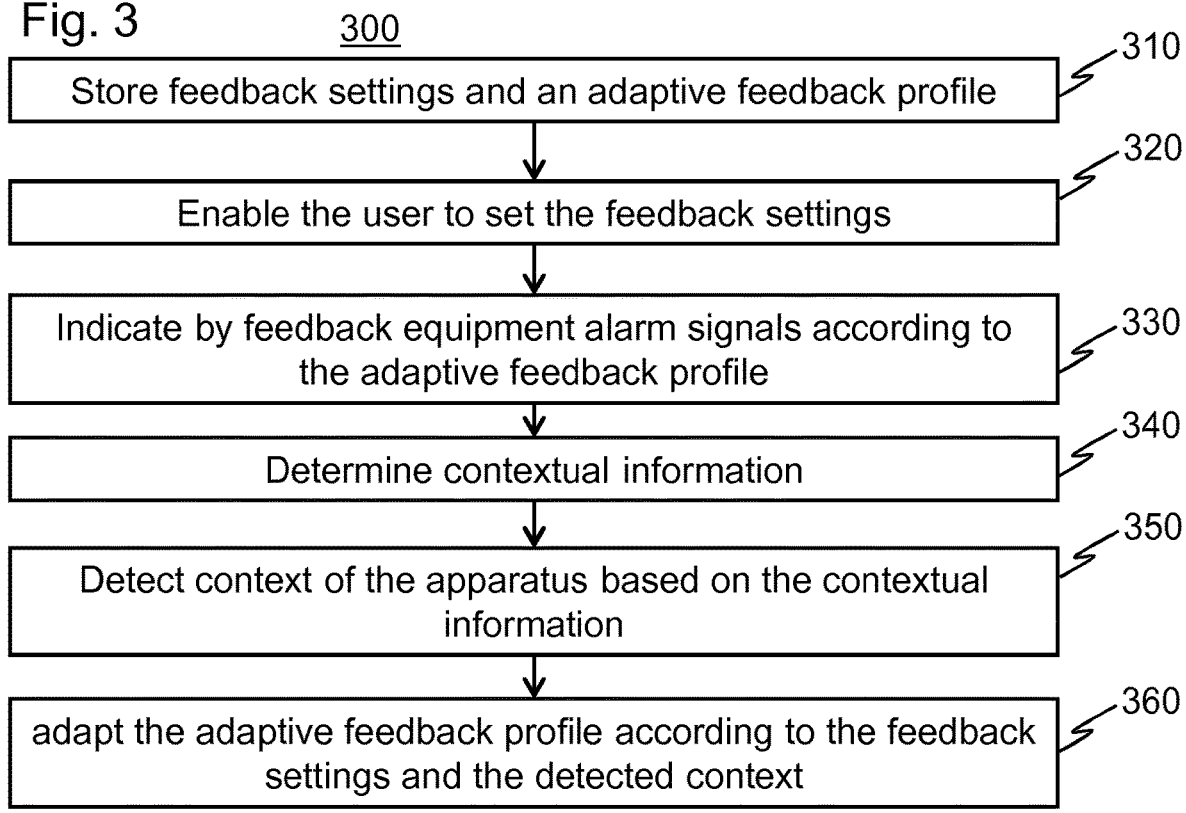
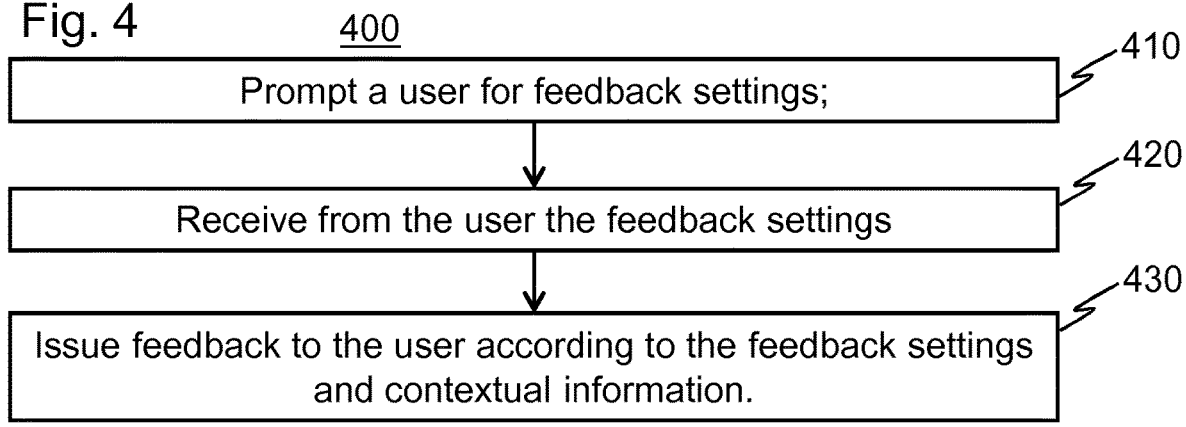

METHOD AND APPARATUS FOR ADAPTIVE FEEDBACK

TECHNICAL FIELD

The present invention relates in particular, though not exclusively, to adaptive feedback of a portable device.

BACKGROUND

This section illustrates useful background information without admission of any technique described herein representative of the state of the art.

Vibration based alert signals are used in mobile phones to help their users to notice events such as incoming calls and also more recently to provide haptic feedback on using a touch screen to type text. Such feedback helps to perceive unexpected alarm signals and to identify successful entry of a character in the absence of an inherent tactile response.

Alarm signals, whether audible or tactile, are not the better the stronger they are. Too strong alarm signals are easily perceived as disturbing. There are some techniques for setting the desired level of the alarm signals by the user or even automatically when loud noise is experienced.

SUMMARY

Various aspects of examples of the invention are set out in the claims.

According to a first example aspect of the present invention, there is provided an apparatus, comprising:
- at least one processor; and
- at least one memory configured to store computer program code;
- the at least one memory and the computer program code configured to, with the at least one processor, cause the apparatus to perform at least the following:
- store an adaptive feedback profile;
- determine contextual information;
- detect context of the apparatus based on the contextual information;
- adapt the adaptive feedback profile according to the detected context; and
- control producing of user feedback according to the feedback profile.

The adaptive feedback profile may be stored in the memory. Alternatively, at least a part of the adaptive feedback profile may be stored in another memory. The another memory may comprise a user replaceable memory such as a memory card or memory stick and/or a remote memory accessible to the processor through one or more communication channels. The communication channels may comprise at least one of: a mobile communication network; the Internet; a wireless local area network; a satellite communication network; and point-to-point communication link.

The apparatus may further comprise feedback equipment configured to produce user feedback signals according to the adaptive feedback profile.

The apparatus may be configured to be capable for operating as one or more of: a mobile phone; a game console; a navigation device; an electric book; a digital camera; a tablet computer; a personal digital assistant; and a user interface device configured to operate as an external user interface for another device.

The apparatus may be a portable device. The apparatus may be a handheld device. The apparatus may be a battery operated device.

The feedback equipment may comprise one or more feedback components. The feedback equipment may consist of one or more feedback components.

The user feedback signals may comprise haptic feedback signals.

The apparatus may further comprise a user interface configured to enable a user to set the feedback settings. The at least one memory and the computer program code configured to, with the at least one processor, cause the apparatus to perform the adapting of the adaptive feedback profile according to the feedback settings and the detected context.

The contextual information may comprise non-sensory information. The contextual information may be non-sensory information.

The contextual information may comprise a location of the apparatus.

The contextual information may comprise a speed of movement of the apparatus.

The contextual information may comprise a time of day.

The contextual information may comprise a current date.

The contextual information may comprise an indication of the environment around the apparatus.

The contextual information may comprise an indication of environmental openness. The environmental openness may be determined by determining acoustic response to audible signals produced by the apparatus.

The contextual information may comprise information of present use of the apparatus.

The adapting of the adaptive feedback profile may be performed on meeting a predetermined criterion or criteria. For instance, adapting of the adaptive feedback profile may be performed periodically. The adapting of the adaptive feedback profile may be performed with a given period. The adapting of the adaptive feedback profile may be performed on meeting a predetermined criterion. The predetermined criterion may be the change of the contextual information.

The contextual information may comprise a plurality of different parameters. The adapting of the adaptive feedback profile may be performed as a function of the plurality of different parameters.

The adapting of the adaptive feedback profile may be further based on sensory information. The sensory information may comprise measured speed of the apparatus. The sensory information may comprise ambient noise measurement. The sensory information may comprise ambient light measurement. The sensory information may comprise detection of a source of a sound audible to the apparatus. The adapting of the adaptive feedback profile may be based on both the contextual information and on the sensory information so that the contextual information prevails against the sensory information. The contextual information may prevail in case that the contextual information and the sensory information have conflicting effects on the adaptive feedback profile.

The feedback settings may prevail against the adaptive feedback profile in the adapting of the adaptive feedback profile.

In an example embodiment, the adaptive feedback profile comprises at least one of: a haptic feedback profile; an ultrasonic feedback profile; an audio feedback profile; a visual feedback profile; a thermal feedback profile; and a chemical feedback profile.

The feedback equipment may comprise a one or more of haptic feedback actuators. The adapting of the adaptive feedback profile may comprise adjusting individually operation of one of the plurality of haptic feedback actuators. The adapting of the adaptive feedback profile may comprise adjusting individually operation of two of the haptic feedback actuators. The adapting of the adaptive feedback profile may comprise adjusting individually operation of each of the plural haptic feedback actuators.

The feedback equipment may comprise ultrasonic feedback equipment configured to produce user feedback signals according to an ultrasonic feedback profile. The apparatus may be configured to adjust the ultrasonic feedback profile based on the contextual information. The ultrasonic feedback equipment may be configured to cause a haptic response on at least one part of the apparatus.

The feedback equipment may comprise audible feedback equipment configured to indicate user feedback signals according to the audible feedback profile. The apparatus may be configured to adjust the audible feedback profile based on the contextual information.

The feedback equipment may comprise visual feedback equipment configured to produce user feedback signals according to the visual feedback profile. The apparatus may be configured to adjust the visual feedback profile based on the contextual information.

The feedback equipment may comprise thermal feedback equipment configured to produce user feedback signals according to the thermal feedback profile. The apparatus may be configured to adjust the thermal feedback profile based on the contextual information.

The feedback equipment may comprise chemical feedback equipment configured to produce user feedback signals according to the chemical feedback profile. The apparatus may be configured to adjust the chemical feedback profile based on the contextual information.

The feedback equipment may comprise global feedback equipment configured to provide feedback that is perceivable on the entire apparatus or on substantially the entire apparatus.

The feedback equipment may comprise local feedback equipment configured to provide feedback that is configured to effect substantially on only a part of the apparatus. The part being affected may comprise a minority of the mass of the apparatus.

The adaptive feedback profile may define one or more parameters.

The adaptive feedback profile may define a feedback waveform for the operation of the feedback equipment.

The adaptive feedback profile may define a feedback rhythm for the operation of the feedback equipment.

According to a second example aspect of the present invention, there is provided a user interface comprising:
an input configured to receive feedback settings; and
a user feedback output configured to issue feedback to the user according to the feedback settings and contextual information.

According to a third example aspect of the present invention, there is provided a method comprising:
storing an adaptive profile;
producing user feedback signals according to the adaptive feedback profile;
determining contextual information;
detecting context of the apparatus based on the contextual information; and
adapting the adaptive feedback profile according to the feedback settings and the detected context.

The method may further comprise enabling a user to set the feedback settings. The adaptive feedback profile may be adapted according to the feedback settings and the detected context.

According to a fourth example aspect of the present invention, there is provided a method comprising:
receiving from a user feedback settings; and
issuing feedback to the user according to the feedback settings and contextual information.

According to a fifth example aspect of the present invention, there is provided a computer program comprising computer executable program code configured to enable an apparatus, when running the program code, to perform the method of the second or third example aspect.

According to a sixth example aspect of the present invention, there is provided a computer readable memory medium comprising the computer program of the fifth example aspect.

The memory medium may comprise digital data storage such as a data disc or diskette, optical storage, magnetic storage, holographic storage, opto-magnetic storage, phase-change memory, resistive random access memory, magnetic random access memory, solid-electrolyte memory, ferro-electric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 3 shows a flow chart of a process of an example embodiment; and

FIG. 4 shows a flow chart of a process of an example embodiment.

DETAILED DESCRIPTION OF THE DRAWINGS

An example embodiment of the present invention and its potential advantages are understood by referring to FIGS. 1 through 4 of the drawings. In this document, like reference signs denote like parts or steps.

Figure 1:
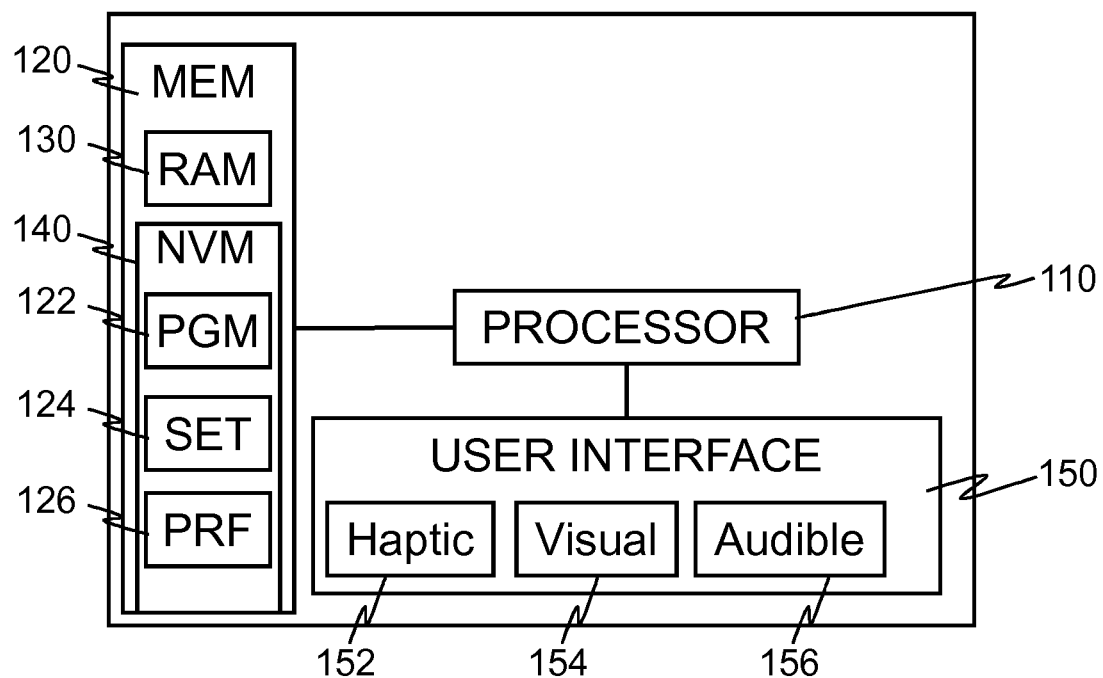
FIG. 1 shows a block diagram of an apparatus of an example embodiment of the invention.

FIG. 1 shows a block diagram of an apparatus 100 of an example embodiment of the invention. The apparatus 100 comprises:
at least one processor 110;
at least one memory 120 configured to store computer program code 122; feedback settings 124; and an adaptive feedback profile 126; feedback equipment configured to produce user feedback signals according to the adaptive feedback profile 126;

the at least one memory 120 and the computer program code 122 configured to, with the at least one processor 110, cause the apparatus 100 to perform at least the following:

determine contextual information;

detect context of the apparatus 100 based on the contextual information; and adapt the adaptive feedback profile 126 according to the detected context.

In an example embodiment, the adapting of the adaptive feedback profile is performed on meeting a predetermined criterion or criteria, e.g. periodically. The adapting of the adaptive feedback profile can be performed with a given period. For example, the adapting of the adaptive feedback profile may be performed on meeting a predetermined criterion such as the change of the contextual information.

The at least one memory 120 can be comprised locally in the apparatus or at least in part distributed in more than one locations and accessible to the processor 110. In the example embodiment of FIG. 1, the adaptive feedback profile is stored in the memory. In another example embodiment, at least a part of the adaptive feedback profile is stored in another memory. The another memory comprises, for example, a user replaceable memory such as a memory card or memory stick and/or a remote memory accessible to the processor through one or more communication channels. The communication channels comprise, for example, at least one of: a mobile communication network; the Internet; a wireless local area network; a satellite communication network; and point-to-point communication link.

In an example embodiment, the apparatus further comprises a user interface 150 configured to enable a user to set the feedback settings 124 and the computer program code 122 is configured to, with the at least one processor 110, cause the apparatus 100 to perform the adapting of the adaptive feedback profile 126 according to the feedback settings 124 and the detected context.

The user feedback signal comprises at least one of: audible; visual; haptic; thermal; and olfactory signals.

In an example embodiment, the feedback equipment comprises one or more of any of: haptic feedback equipment 152; visual feedback equipment 154; and audible feedback equipment 156. Any of the listed equipment may consist of one or more components. The components can be e.g. dedicated and/or generic components with more than one functions or operations.

In an example embodiment, the apparatus the apparatus is configured to be capable for operating as one or more of: a mobile phone; a game console; a navigation device; an electric book; a digital camera; a tablet computer; a personal digital assistant; and a user interface device configured to operate as an external user interface for another device e.g. over wireless or wired connection with the another device.

In an example embodiment, the apparatus the apparatus is a portable device. For example, the apparatus may be a handheld device. The apparatus may be a battery operated device.

In an example embodiment, the feedback equipment comprises of one or more feedback components. For example, the feedback equipment can be provided by a module comprising one or more electric transducers capable of producing the user feedback signals. On the other hand, the feedback equipment can be distributed in various positions within the interior and/or on surfaces of the apparatus 100. Moreover, the feedback equipment can be implemented so that some of its parts have also a second function such user input detection. For example, a haptic output can be configured to also detect user induced forces. For instance, some electrostatic actuators such as piezoelectric actuators and electro-dynamic actuators can induce force and thus be used for haptic feedback on feeding electric power to such actuators. Such actuators may also induce electric signals when exposed to user induced force.

In an example embodiment, the apparatus is configured to produce user feedback signals to alarm or notify the user of a given event such as an incoming call or message; to provide feedback of a user action such as pressing a key, pressing a soft key or receiving any input from the user.

In an example embodiment, the memory 120 comprises a work memory 130 and a persistent or non-volatile memory 140.

In an example embodiment, the adapting of the adaptive feedback profile 126 according to the feedback settings 124 and the detected context is performed separately with regard to the feedback settings 124 and for the detected context. In the adapting, the adaptive feedback profile may be updated or modified. The adapting can be made gradually e.g. using sliding average technique to change one or more parameters of the adaptive feedback profile. Some other parameters can be changed more abruptly e.g. between binary or Boolean states (e.g. 0/1).

In an example embodiment, the contextual information comprises non-sensory information. The contextual information may be non-sensory information.

In an example embodiment, the contextual information comprises at least one of: a location of the apparatus; a speed of movement of the apparatus; a time of day; a current date; an indication of the environment around the apparatus; an indication of environmental openness; present use of the apparatus (e.g. currently used application and/or service). For example, the environmental openness may be determined by determining acoustic response to audible signals produced by the apparatus. For instance, the apparatus can be configured to issue inaudible or weakly audible signals and to record by a microphone echoes and detect delay and damping of the recorded acoustic response.

In an example embodiment, the contextual information defines the operating state of the apparatus, such as currently running application; service being used; information about the environment of the apparatus; time; date; weekday; calendar tasks set in the apparatus; and/or information about ongoing navigation for which the apparatus is being used or that a separate navigation device is providing for the user of the apparatus. Moreover, or alternatively, the context information can define e.g. one or more of: a location; an altitude; an environmental openness of the location; a velocity and a direction of motion of the apparatus; a mode of transport (for example, walking, travelling by car); a location of the apparatus relative to the user (for example held in hand, on the table, in the jeans' back pocket, in the jeans' front pocket); an illumination and various analyses made from camera signals; a spectrum of electromagnetic radiation below and above visible light frequencies based on camera signals; a sound and various analyses made from its capture (for example a background noise); ambient temperature; other ambient conditions (for example a humidity; a wind speed relative to the user; and a wind direction relative to the user); a currently used application in the device; recently used applications in the device; amount of other people within a given range.

In an example embodiment, the contextual information comprises a plurality of different parameters. For example, the adapting of the adaptive feedback profile 126 can be performed as a function of the plurality of different parameters.

In an example embodiment, the adapting of the adaptive feedback profile 126 is further based on sensory information. The sensory information may comprise, for example, any one or more of: a measured speed of the apparatus; an ambient noise measurement; an ambient light measurement; and a detection of a source of a sound audible to the apparatus.

In an example embodiment, the adapting of the adaptive feedback profile 126 is based on both the contextual information and on the sensory information so that the contextual information prevails against the sensory information. It is understood that the apparatus may also use the sensory data to adapt the context, but until then and even thereafter, there may be a conflict between requirements imposed by the context and the sensory data. For example, in web browsing or playing a game using the apparatus 100, the user may occasionally scrape microphone area of the apparatus 100. This could cause significant microphone signal levels that could be misinterpreted as requiring adapting the adaptive feedback profile 126 in a manner that is desirable in a noisy environment. However, the context information may be used to prevent such erroneous operation, in result making the feedback more precisely adapted than possible with mere sensory data. In effect, the contextual information may prevail in case that the contextual information and the sensory information have conflicting effects on the adaptive feedback profile 126.

In an example embodiment, the feedback settings prevail against the adaptive feedback profile in the adapting of the adaptive feedback profile. For example, the user may set the feedback off or to fixed settings, in both of which cases the feedback settings should prevail against the adaptive feedback profile. The feedback settings could be understood as defining the adaptive feedback profile so that the feedback is fixed result in given predetermined feedback (e.g. no feedback at all or constant feedback).

In an example embodiment, the feedback equipment comprises a plurality of haptic feedback actuators. The adapting of the haptic feedback profile comprises, for example, individually adjusting operation of one of the plurality of haptic feedback actuators. Further, the adapting of the haptic feedback profile may comprise adjusting individually operation of two of the haptic feedback actuators. Still further, the adapting of the haptic feedback profile may comprise adjusting individually operation of each of the plural haptic feedback actuators.

In an example embodiment, the feedback equipment comprises audible feedback equipment configured to produce user feedback signals according to an audible feedback profile. The apparatus can be configured, for example, to adjust the audible feedback profile based on the contextual information.

In an example embodiment, the feedback equipment comprises visual feedback equipment configured to produce user feedback signals according to an audible feedback profile. In an example embodiment, the apparatus is configured to adjust the visual feedback profile based on the contextual information.

In an example embodiment, the feedback equipment comprises thermal feedback equipment configured to produce user feedback signals according to a thermal feedback profile. In an example embodiment, the apparatus is configured to adjust the thermal feedback profile based on the contextual information.

In an example embodiment, the feedback equipment comprises chemical feedback equipment configured to produce user feedback signals according to a chemical feedback profile. In an example embodiment, the apparatus is configured to adjust the chemical feedback profile based on the contextual information.

In an example embodiment, the feedback equipment comprises ultrasonic feedback equipment configured to produce user feedback signals according to an ultrasonic feedback profile. In an example embodiment, the apparatus is configured to adjust the ultrasonic feedback profile based on the contextual information.

In an example embodiment, the feedback equipment comprises global feedback equipment configured to provide feedback that is perceivable on the entire apparatus or on substantially the entire apparatus. The global feedback equipment comprises, for example, motor driven acentric mass based vibrators, electro-active polymer actuator and/or oscillating mass vibrators.

In an example embodiment, the feedback equipment comprises local feedback equipment configured to provide feedback that is configured to effect substantially on only a part of the apparatus. In an example embodiment, the part being affected comprises a minority of the mass of the apparatus. The local feedback equipment comprises, for example, an electrostatic vibrator such as a piezoelectric vibrator and/or an electro-dynamic vibrator such as a solenoid vibrator. In an example embodiment, the local feedback equipment comprises a portion or consists of a portion of the global feedback equipment.

In an example embodiment, the adaptive feedback profile defines one or more parameters. For example, the adaptive feedback profile may define any one or more of: a feedback waveform for the operation of the feedback equipment; and a feedback rhythm for the operation of the feedback equipment.

As one use case, the context is detected e.g. taking into account acceleration sensor data that indicates walking, positioning information matching with the normal speed of walking. In this context, the adaptive feedback profile can be set easily distinctive when walking, e.g. using high or maximum amplitude using a global haptic feedback actuator (in case that the local haptic feedback does not cause perceivable difference in the haptic feedback that could be sensed by the user when the apparatus is in the user's pocket). On the other hand, in a case that the user holds the apparatus in her hands (e.g. detected from accelerations or lack thereof and/or detection of fingers of the user on touch screen and possibly also from the application or service being used), a modest or low amplitude and/or short bursts of feedback can be automatically produced.

In another use case, the holding of the apparatus 100 with gloves by the user is detected e.g. using capacitive sensors in the apparatus 100 (not shown). In this case, the context is adapted to account for changed haptic or tactile response. For example, by suitable adjustment of the adaptive feedback profile, the haptic feedback is amplified, local feedback is disabled, haptic feedback is disabled (e.g. if it might not be perceivable by the user), and/or audible feedback is switched on or amplified.

Figure 2:
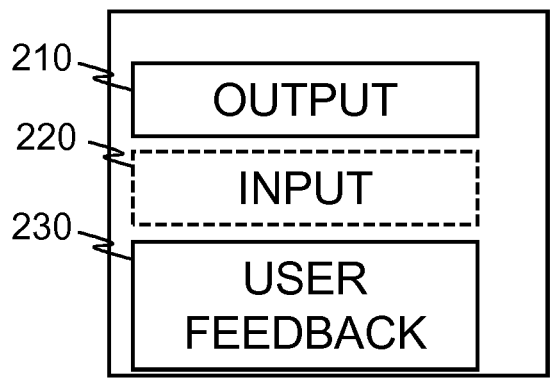
FIG. 2 shows a block diagram of a user interface of an example embodiment.

FIG. 2 shows a block diagram of a user interface 200 of an example embodiment, comprising:
 an output 210 configured to prompt a user for the feedback settings 124;
 an input 220 configured to receive from the user the feedback settings 124; and a user feedback 230 configured to issue feedback to the user according to the feedback settings 124 and contextual information.

In an example embodiment, the user interface 200 is not configured to input the feedback settings by the input 220 (the user interface 200 may even lack the input 220) and to use the feedback settings in issuing feedback to the user.

In an example embodiment, the user interface 200 is implemented by computer executable software comprising computer executable program code for execution by a computer. In an alternative example embodiment, the user interface 200 is implemented using a hardwired processing circuitry.

FIG. 3 shows a flow chart of a process 300 of an example embodiment, comprising:
storing 310 feedback settings and an adaptive feedback profile;
enabling 320 the user to set the feedback settings;
producing 330 by feedback equipment user feedback signals according to the adaptive feedback profile;
determining 340 contextual information;
detecting 350 context of the apparatus based on the contextual information; and
adapting 360 the adaptive feedback profile according to the feedback settings and the detected context.

In an example embodiment, there is no storing of feedback settings or using the feedback settings in the adapting of the adaptive feedback profile.

FIG. 4 shows a flow chart of a process 400 of an example embodiment, comprising:
prompting 410 a user for feedback settings;
receiving 420 from the user the feedback settings; and
issuing 430 feedback to the user according to the feedback settings and contextual information.

Without in any way limiting the scope, interpretation, or application of the claims appearing below, a technical effect of one or more of the example embodiments disclosed herein is that feedback can be adapted context-specifically to meet prevailing needs even when locally measured sensory information is erratic. Another technical effect of one or more of the example embodiments disclosed herein is that user feedback signals can be made sufficiently perceivable to the user without excess energy consumption and undue disturbance to proximate people when reduced feedback would suffice to draw the user's attention.

Embodiments of the present invention may be implemented in software, hardware, application logic or a combination of software, hardware and application logic. The software, application logic and/or hardware may reside on memory 130. If desired, part of the software, application logic and/or hardware may reside on a dedicated memory, part of the software, application logic and/or hardware may reside on memory common with other components, and part of the software, application logic and/or hardware may reside on in yet further memory. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 1. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processor; and
at least one memory configured to store computer program code;
the at least one memory and the computer program code configured to, with the at least one processor, cause the apparatus to at least:
define an adaptive feedback profile from a plurality of feedback profiles based on detecting contextual information, wherein the contextual information comprises collecting non-sensory information and sensory information;
determine a change in context environment of the apparatus based on, at least, the detected contextual information and comprising collected sensory information and non-sensory information;
adjust the adaptive feedback profile to address the determined change in context environment of the apparatus by causing, at least in part, an adjustment of a global feedback component and a local feedback component, wherein the global feedback component and the local feedback component each generate one or more user feedback signals, and wherein the one or more feedback signals associated with the global feedback component provide perceivable feedback on the entire apparatus and the one or more feedback signals associated with the local feedback component provide perceivable feedback on a part of the apparatus; and
output the one or more feedback signals according to the adjusted adaptive feedback profile.

2. The apparatus as claimed in claim 1, wherein the contextual information comprises a location of the apparatus.

3. The apparatus according to claim 1, wherein the contextual information comprises a speed of movement of the apparatus.

4. The apparatus as claimed in claim 1, wherein the contextual information comprises at least one of:
time of day; or
date.

5. The apparatus as claimed in claim 1, wherein the contextual information comprises an indication of an environment around the apparatus.

6. The apparatus as claimed in claim 1, wherein the contextual information comprises an indication of environmental openness.

7. The apparatus as claimed in claim 1, wherein the contextual information comprises a plurality of different parameters.

8. The apparatus as claimed in claim 7, wherein the adaptive feedback profile is adapted based on a function of the plurality of different parameters.

9. The apparatus as claimed in claim 1, wherein the adaptive feedback profile is adapted based on the sensory information and the non-sensory information.

10. The apparatus as claimed in claim 9, wherein the sensory information comprises a measured speed of the apparatus.

11. The apparatus as claimed in claim 9, wherein the sensory information comprises an ambient noise measurement.

12. The apparatus as claimed in claim 1, wherein the adaptive feedback profile is adapted based on both the contextual information and the sensory information so that the contextual information prevails against the sensory information.

13. The apparatus as claimed in claim 1, further comprising one or more of haptic feedback actuators.

14. The apparatus as claimed in claim 1, further comprising a plurality of haptic feedback actuators, wherein the adaptive feedback profile is further adapted by adjusting individual operation of one or more of the plurality of haptic feedback actuators.

15. The apparatus as claimed in claim 1, wherein the apparatus is configured to produce the one or more feedback signals according to an audible feedback profile.

16. The apparatus as claimed in claim 15, further configured to adjust the audible feedback profile based on the contextual information.

17. The apparatus as claimed in claim 1, wherein the apparatus is configured to produce the one or more feedback signals according to the adaptive feedback profile by providing feedback at least on the part of the apparatus.

18. The apparatus as claimed in claim 1, wherein the apparatus is configured to produce the feedback signals according to at least one of: an ultrasonic feedback profile; a thermal feedback profile; or a chemical feedback profile.

19. A method comprising:
defining an adaptive feedback profile from a plurality of feedback profiles based on detecting contextual information, wherein the contextual information comprises collecting non-sensory information and sensory information;
determining a change in context environment of an apparatus based on, at least, the detected contextual information and comprising collected sensory information and non-sensory information;
adjusting the adaptive feedback profile to address the determined change in context environment of the apparatus by causing, at least in part, an adjustment of a global feedback component and a local feedback component, wherein the global feedback component and the local feedback component each generate one or more user feedback signals, and wherein the one or more feedback signals associated with the global feedback component provide perceivable feedback on the entire apparatus and the one or more feedback signals associated with the local feedback component provide perceivable feedback on a part of the apparatus; and
outputting the one or more feedback signals according to the adjusted adaptive feedback profile.

20. A computer program product comprising at least one non-transitory computer-readable medium encoded with a computer program of instructions, which when executed, causes an apparatus to perform a process comprising:
defining an adaptive feedback profile from a plurality of feedback profiles based on detecting contextual information, wherein the contextual information comprises collecting non-sensory information and sensory information;
determining a change in context environment of the apparatus based on, at least, the detected contextual information and comprising collected sensory information and non-sensory information;
adjusting the adaptive feedback profile to address the determined change in context environment of the apparatus by causing, at least in part, an adjustment of a global feedback component and a local feedback component, wherein the global feedback component and the local feedback component each generate one or more user feedback signals, and wherein the one or more feedback signals associated with the global feedback component provide perceivable feedback on the entire apparatus and the one or more feedback signals associated with the local feedback component provide perceivable feedback on a part of the apparatus; and
outputting the one or more feedback signals according to the adjusted adaptive feedback profile.

* * * * *